US010703008B2

(12) United States Patent
Martin

(10) Patent No.: US 10,703,008 B2
(45) Date of Patent: Jul. 7, 2020

(54) PORTABLE CUTTING DEVICE WITH SEALING ARRANGEMENT FOR VACUUM

(71) Applicant: Charles B. Martin, Washington, IL (US)

(72) Inventor: Charles B. Martin, Washington, IL (US)

(*) Notice: Subject to any disclaimer, the term of this patent is extended or adjusted under 35 U.S.C. 154(b) by 26 days.

(21) Appl. No.: 15/984,648

(22) Filed: May 21, 2018

(65) Prior Publication Data

US 2018/0264678 A1 Sep. 20, 2018

Related U.S. Application Data

(60) Continuation of application No. 14/993,326, filed on Jan. 12, 2016, now Pat. No. 9,975,268, which is a continuation of application No. 14/136,903, filed on Dec. 20, 2013, now Pat. No. 9,242,304, which is a division of application No. 12/767,687, filed on Apr. 26, 2010, now abandoned.

(60) Provisional application No. 61/172,607, filed on Apr. 24, 2009.

(51) Int. Cl.
*B27B 9/02* (2006.01)
*B27G 19/04* (2006.01)
*B23D 59/00* (2006.01)

(52) U.S. Cl.
CPC .......... *B27G 19/04* (2013.01); *B23D 59/006* (2013.01); *B27B 9/02* (2013.01)

(58) Field of Classification Search
CPC ...... B27G 10/04; B27G 19/04; B23D 59/006; B27B 9/02
See application file for complete search history.

(56) References Cited

U.S. PATENT DOCUMENTS

| 3,103,069 A | 9/1963 | Gary |
| 3,262,199 A | 7/1966 | Magarian |
| 3,262,472 A | 7/1966 | McCarty et al. |
| 3,525,183 A | 8/1970 | Gargrave |
| 3,707,020 A | 12/1972 | Stewart |
| 3,736,728 A | 6/1973 | Kleissler, Jr. |
| 3,787,973 A | 1/1974 | Beisch et al. |
| 3,882,598 A | 5/1975 | Earle et al. |
| 3,913,437 A | 10/1975 | Speer |
| 3,938,283 A | 2/1976 | Keith, Jr. |
| 3,965,787 A | 6/1976 | Plischke |
| 4,241,505 A | 12/1980 | Bodycomb, Jr. et al. |

(Continued)

OTHER PUBLICATIONS

International Search Report for International Patent Application No. PCT/US2010/32440 dated Jul. 6, 2010; 2 pages.

(Continued)

*Primary Examiner* — Andrea L Wellington
*Assistant Examiner* — Fernando A Ayala
(74) *Attorney, Agent, or Firm* — Howard & Howard Attorneys PLLC

(57) ABSTRACT

A portable cutting device having a cutting tool for cutting a material. The cutting device includes a motor driving the cutting tool and a shroud at least partially enclosing the cutting tool. The shroud defines a debris accumulation chamber for gathering debris created by the cutting tool cutting the material. An impeller is operatively coupled to the motor and driven by the motor to create suction pressure to draw the debris out of the debris accumulation chamber and into a collection bag.

15 Claims, 19 Drawing Sheets

(56) References Cited

U.S. PATENT DOCUMENTS

| | | |
|---|---|---|
| 4,281,457 A | 8/1981 | Walton, II |
| 4,300,318 A | 11/1981 | Brown |
| 4,466,187 A | 8/1984 | Morimoto |
| 4,531,329 A * | 7/1985 | Huber .................. B24B 55/102 451/344 |
| 4,648,301 A | 3/1987 | Scott |
| 4,974,907 A | 12/1990 | Komura |
| 4,999,916 A | 3/1991 | Sistare |
| 5,010,651 A | 4/1991 | Techter et al. |
| 5,050,266 A | 9/1991 | Schneider |
| 5,063,802 A | 11/1991 | Shiotani et al. |
| 5,074,044 A | 12/1991 | Duncan |
| 5,084,972 A | 2/1992 | Waugh |
| 5,107,566 A | 4/1992 | Schmid |
| 5,235,753 A | 8/1993 | Stumpf |
| 5,271,155 A | 12/1993 | Fuchs et al. |
| 5,327,649 A | 7/1994 | Skinner |
| 5,445,056 A | 8/1995 | Folci |
| 5,452,515 A | 9/1995 | Schilling |
| 5,766,062 A | 6/1998 | Edling |
| 5,766,063 A | 6/1998 | Hazenbroek |
| 5,774,992 A | 7/1998 | Lindenmuth |
| 5,795,216 A | 8/1998 | Graves |
| 5,993,305 A | 11/1999 | Chu |
| 6,219,922 B1 | 4/2001 | Campbell et al. |
| 6,263,584 B1 | 7/2001 | Owens |
| 6,354,285 B1 | 3/2002 | Licht et al. |
| 6,427,570 B1 | 8/2002 | Miller et al. |
| 6,431,040 B1 | 8/2002 | Miller et al. |
| 6,447,379 B1 | 9/2002 | Gromko et al. |
| 6,557,261 B1 | 5/2003 | Buser |
| 6,614,508 B2 | 9/2003 | Phillips et al. |
| 6,827,640 B2 | 12/2004 | Bures et al. |
| 6,948,412 B2 * | 9/2005 | Brazell .................. B23D 59/006 144/252.2 |
| 7,281,332 B2 | 10/2007 | Niwa et al. |
| 7,328,512 B2 | 2/2008 | Martin |
| 7,526,866 B2 * | 5/2009 | Schnell .................. B23D 59/006 144/252.1 |
| 7,578,063 B2 | 8/2009 | Martin |
| 7,802,505 B2 | 9/2010 | Hetcher et al. |
| 7,976,363 B2 | 7/2011 | Reich et al. |
| 8,201,335 B2 | 6/2012 | Martin |
| 9,975,268 B2 | 5/2018 | Martin |
| 2002/0166245 A1 | 11/2002 | Williams |
| 2003/0005800 A1 | 1/2003 | Czamek et al. |
| 2004/0261592 A1 | 12/2004 | Chen |
| 2006/0053629 A1 * | 3/2006 | Martin .................. B23D 59/006 30/123 |
| 2006/0101965 A1 | 5/2006 | Carroll |
| 2006/0211351 A1 | 9/2006 | Ikeda et al. |
| 2007/0044609 A1 | 3/2007 | Brazell et al. |
| 2007/0261182 A1 | 11/2007 | Fernandez-Grandizo Martinez |
| 2008/0011138 A1 * | 1/2008 | Brazell .................. B23D 59/006 83/100 |
| 2008/0134518 A1 | 6/2008 | Martin |
| 2008/0163492 A1 | 7/2008 | Johansson |
| 2008/0172891 A1 | 7/2008 | Nie |
| 2009/0183377 A1 | 7/2009 | Loveless et al. |
| 2010/0089497 A1 | 4/2010 | Keenan |
| 2010/0269353 A1 * | 10/2010 | Martin .................. B23D 59/006 30/124 |
| 2010/0325903 A1 * | 12/2010 | Patel .................... B23D 45/122 30/377 |
| 2011/0011229 A1 | 1/2011 | Lawlor |
| 2011/0079207 A1 | 4/2011 | Guth |
| 2011/0162501 A1 | 7/2011 | Koegel |
| 2011/0219628 A1 * | 9/2011 | Harrison ............... B23D 59/006 30/124 |
| 2014/0013909 A1 * | 1/2014 | Carlsson ............... B28D 1/045 83/100 |
| 2014/0260848 A1 | 9/2014 | Gantke |
| 2014/0357168 A1 | 12/2014 | Nabb |

OTHER PUBLICATIONS

Written Opinion for International Patent Application No. PCT/US2010/32440 dated Jul. 6, 2010; 4 pages.
International Search Report for International Patent Application No. PCT/US2004/38463 dated Mar. 31, 2005; 1 page.
Submission by Inventor Milwaukee Tool Corp. Apr. 2003; 8 pages.
Office Action from the United States Patent and Trademark Office for U.S. Appl. No. 12/767,687 dated Jun. 25, 2013; 11 pages.
Office Action from the United States Patent and Trademark Office for U.S. Appl. No. 12/767,687 dated Aug. 27, 2012; 26 pages.

* cited by examiner

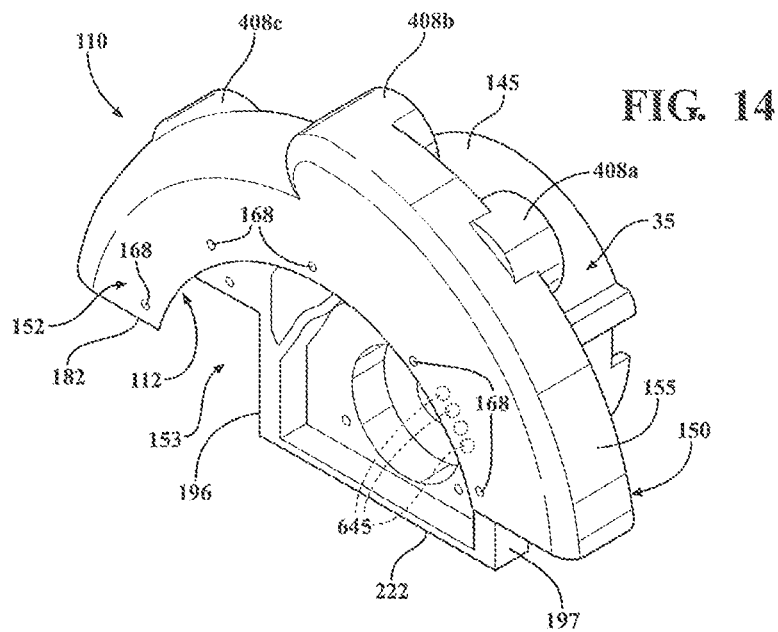
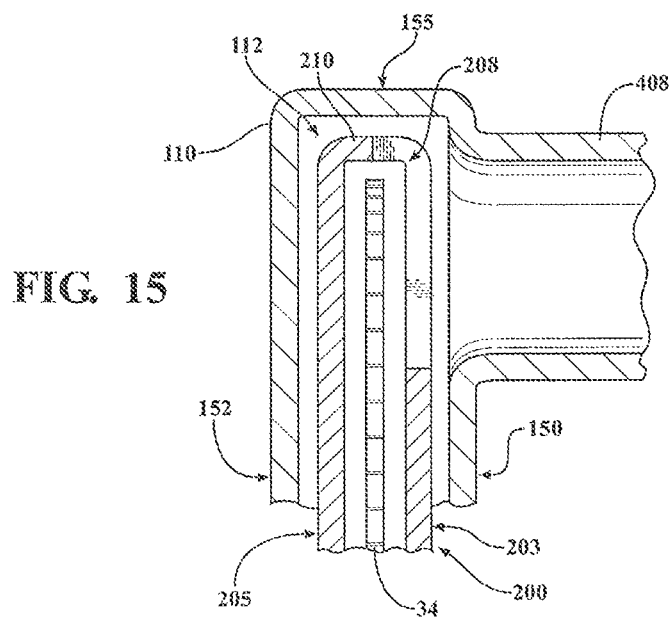

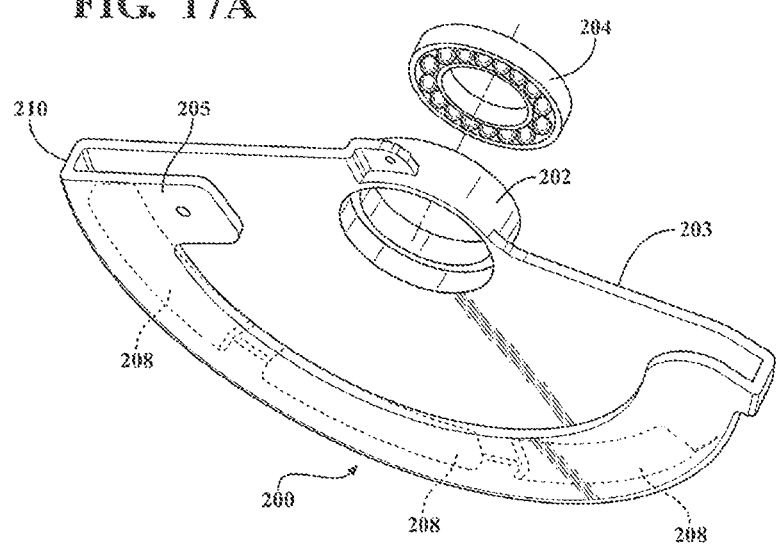
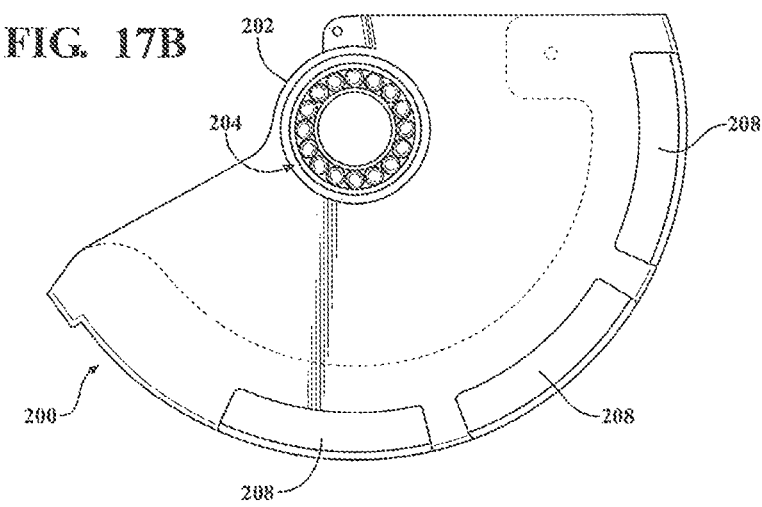

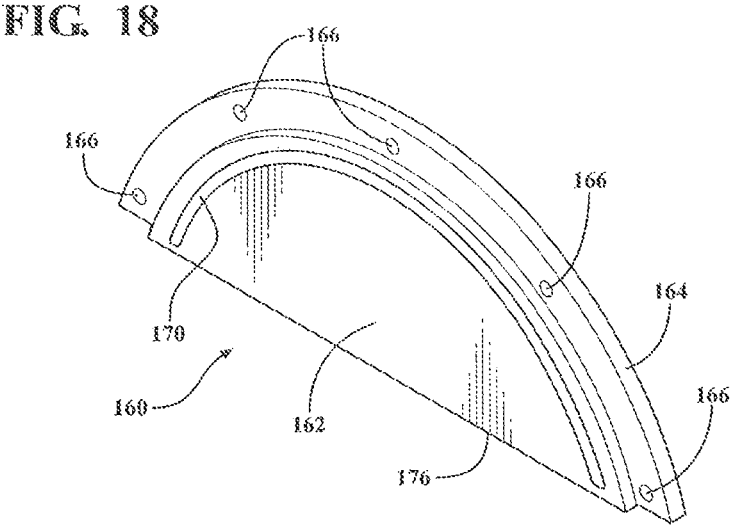
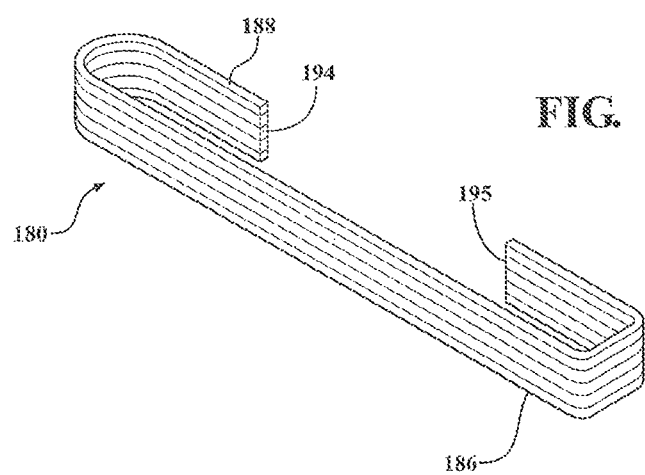

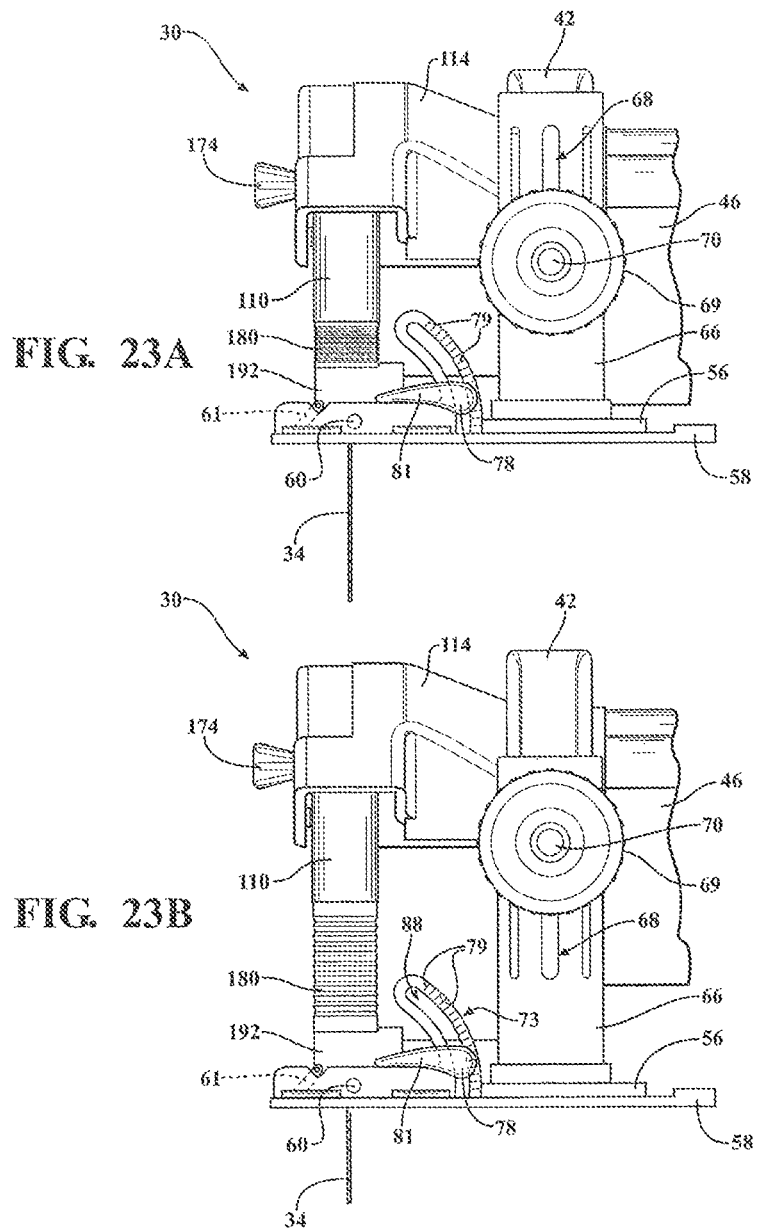

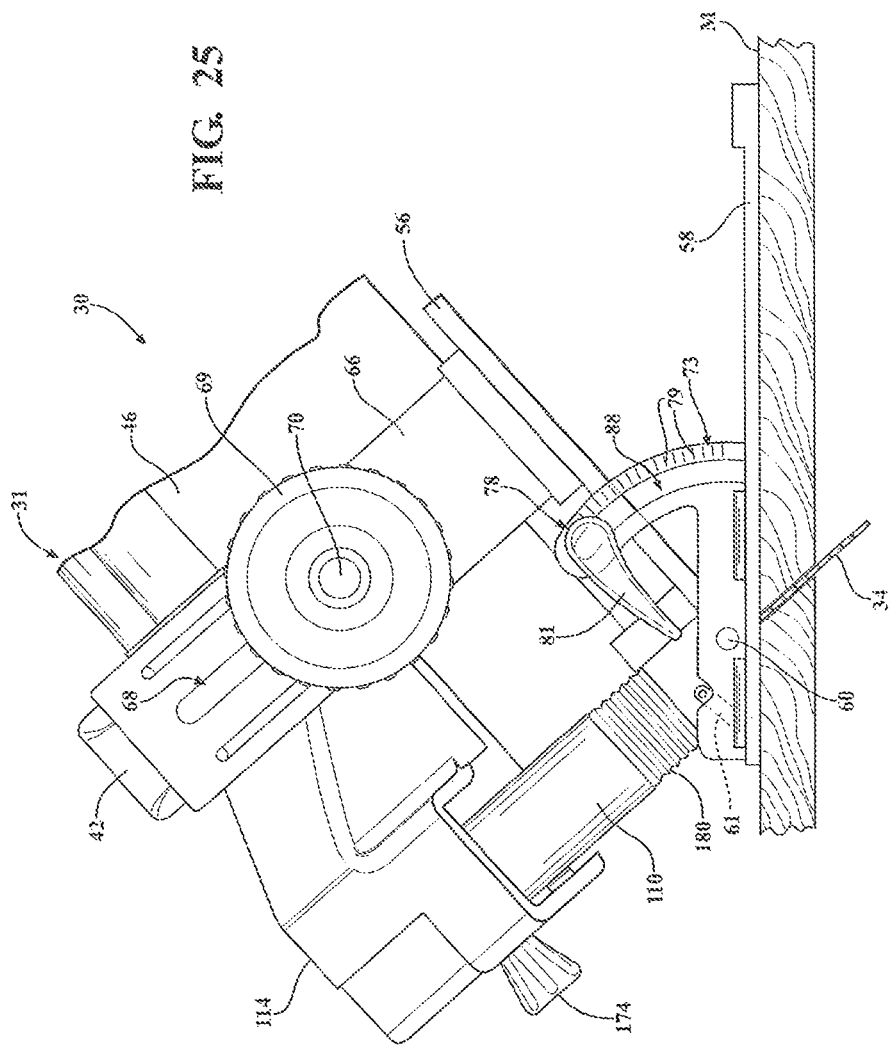

PORTABLE CUTTING DEVICE WITH SEALING ARRANGEMENT FOR VACUUM

CROSS-REFERENCE TO RELATED APPLICATIONS

This application is a continuation of U.S. patent application Ser. No. 14/993,326, filed Jan. 12, 2016, which is a continuation of U.S. patent application Ser. No. 14/136,903, filed Dec. 20, 2013, which is a divisional of U.S. patent application Ser. No. 12/767,687, filed Apr. 26, 2010, entitled "PORTABLE CUTTING DEVICE WITH ON-BOARD DEBRIS COLLECTION," which claims priority to and all benefits of U.S. Provisional Patent Application No. 61/172,607, filed Apr. 24, 2009, entitled "PORTABLE CUTTING DEVICE WITH ON-BOARD DEBRIS COLLECTION," the complete disclosures of all of which are hereby incorporated by reference. The complete disclosure of U.S. patent application Ser. No. 10/939,440, filed Sep. 14, 2004, entitled "SELF-CONTAINED VACUUM SAW," now U.S. Pat. No. 7,328,512, is also hereby incorporated by reference.

FIELD OF THE INVENTION

The present invention relates to a cutting device for cutting a material such as wood, drywall, concrete, roof tiles, slate, etc, which creates debris. More specifically the present invention relates to the cutting device having a platform assembly and a sealing arrangement.

BACKGROUND OF THE INVENTION

Portable cutting devices are well known in the art of carpentry and construction. Such devices include portable circular saws, concrete saws, routers, and the like. When using these devices to cut through materials such as wood, drywall, concrete, roof tiles, slate, etc., cutting debris is created, e.g., saw dust, concrete dust and larger particles. In most cases, protective gear is needed to avoid health hazards associated with this debris. Additionally, the debris accumulates in the area in which the cutting device is being used making clean-up time consuming and difficult. Accordingly, there is a need for portable cutting devices with debris collection systems to collect the dust and larger particles.

Prior art portable cutting devices have been developed to include debris collection systems. These systems typically include a housing defining a debris accumulation chamber and a collection port on the housing for connecting to a vacuum source. The vacuum source draws the debris through the collection port into a collection area. The vacuum source is off-board, meaning that the vacuum source is separate from the cutting device. As a result, when transporting the cutting device between work sites, a vacuum source must be made available at each of the work sites.

SUMMARY OF THE INVENTION AND ADVANTAGES

In one embodiment, a cutting device comprises a motor for driving a cutting blade to cut material. A shroud is configured to at least partially enclose the cutting blade. The shroud defines a debris chamber into which material debris generated by the cutting blade during cutting is received. A source of vacuum is in fluid communication with the debris chamber. A vacuum conduit defines a vacuum path extending between the debris chamber and the source of vacuum. A platform assembly is coupled to the shroud and includes an upper member defining an upper opening for receiving the cutting blade and a lower member defining a lower opening for receiving the cutting blade. The lower member is movable between a plurality of cut depth positions relative to the shroud. A pivot joint couples the lower member to the upper member so that the lower member is pivotable between a plurality of cut angle positions in which a relative angle between the upper member and the lower member is varied. A sealing arrangement is positioned about the lower opening and configured to seal about the lower opening and between the upper member and the lower member as the lower member pivots relative to the upper member between the plurality of cut angle positions to reduce air leakage into the shroud from above the lower opening.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 14 is a right-side front perspective view of the upper blade enclosure;

FIG. 15 is a fragmented sectional view of the upper blade enclosure and the retracted lower blade guard, and the saw blade;

FIG. 17A is a right-side front perspective exploded view of the lower blade guard and its bearing;

FIG. 17B is a left-side view of the lower blade guard and its bearing;

FIG. 18 is a right-side front perspective view of the transparent side window of the portable cutting device;

FIG. 19 is a right-side front perspective view of the main bellows;

FIGS. 23A and 23B are fragmented front views of the portable cutting device in a zero angled state, at comparatively greater and lesser blade depth positions, respectively;

FIG. 25 is an enlarged, fragmentary front view of the portable cutting device in a 45-degree angled state.

Figure 1:
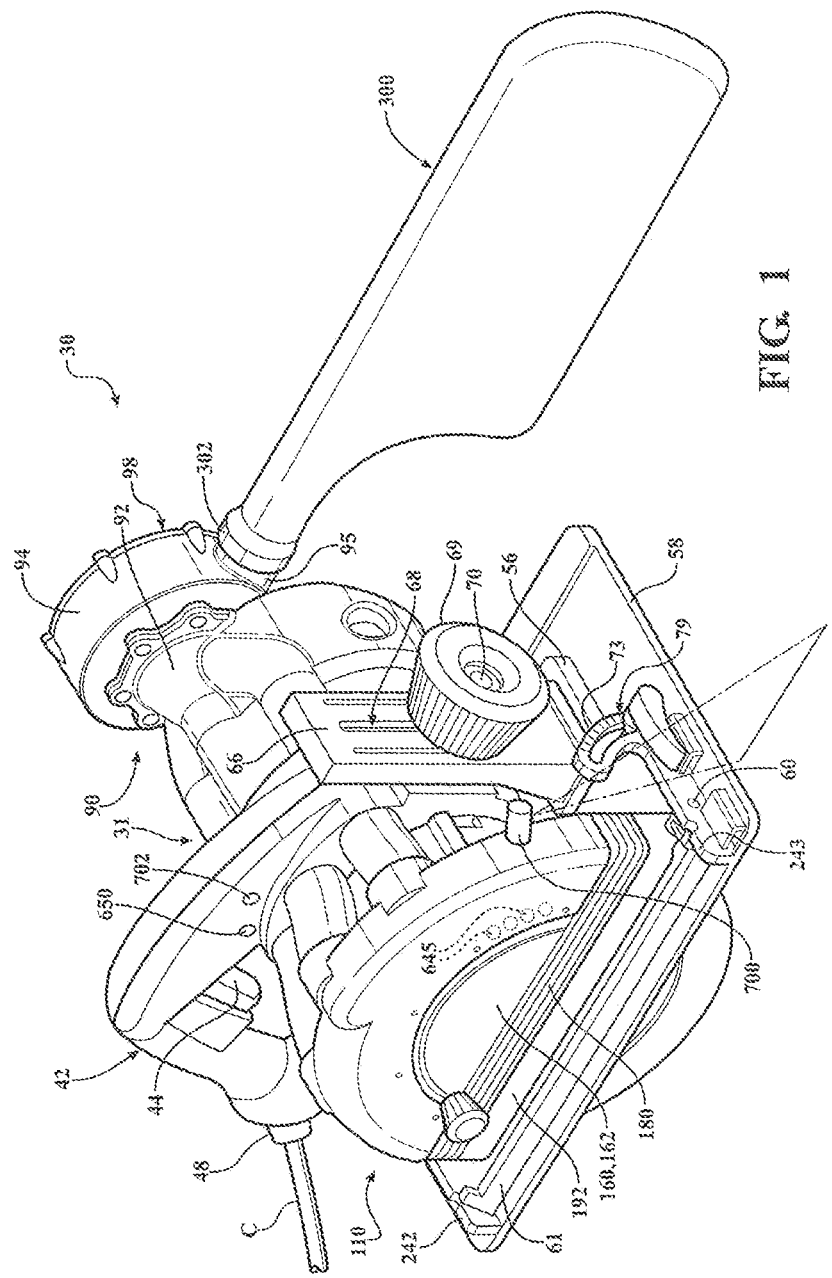
FIG. 1 is a right-side front perspective view of a portable cutting device.

It is to be noted that the Figures are not necessarily drawn to scale. In particular, the scale of some of the elements of the Figures may be exaggerated to emphasize characteristics of the elements. It is also noted that the Figures are not necessarily drawn to the same scale. Elements shown in more than one Figure that may be similarly configured have been indicated using the same reference numerals.

While the invention is susceptible to various modifications and alternative forms, specific embodiments thereof are shown by way of example in the drawings and may herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EXEMPLARY EMBODIMENTS

Referring to the Figures, wherein like numerals indicate like or corresponding parts throughout the several views, a portable cutting device for cutting a material M such as wood, drywall, concrete, roof tiles, slate, etc., is generally shown at 30. The cutting device 30 is defined as being portable because of the ability to easily move the cutting device 30 between work sites. The cutting device 30 preferably weighs less than 50 lbs, more preferably less than 35 lbs, and most preferably less than 20 lbs. The cutting device 30 is also preferably handheld, such that it can be maneuvered, lifted etc. with a single hand.

Referring to FIGS. 1-4B, the cutting device 30 includes saw casing 31 in which is disposed a motor 32 which drives a cutting tool 34. The motor 32 is preferably electrically powered and energized by a 110-volt outlet through a conventional electrical cord C, but the motor 32 could also be battery operated. The motor 32 has a main drive shaft 36 and the cutting tool 34 is operatively coupled to the main drive shaft 36 to rotate upon operation of the motor 32.

Figure 6:
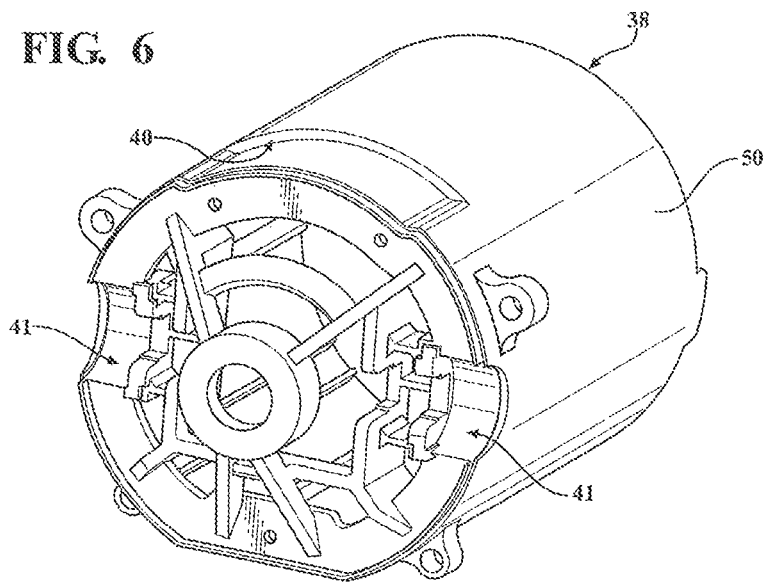
FIG. 6 is a left-side rear perspective view of the motor casing of the portable cutting device.
Figure 7:
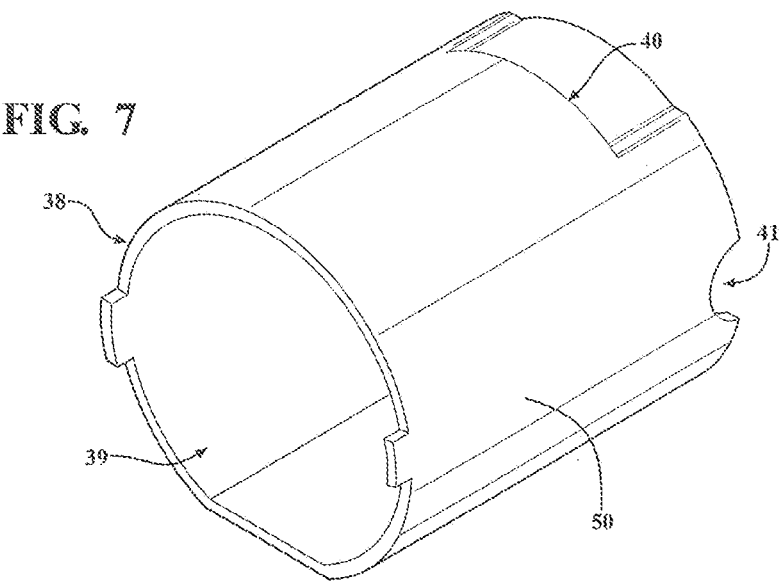
FIG. 7 is a right-side front perspective view of the motor casing of the portable cutting device.
Figure 13:
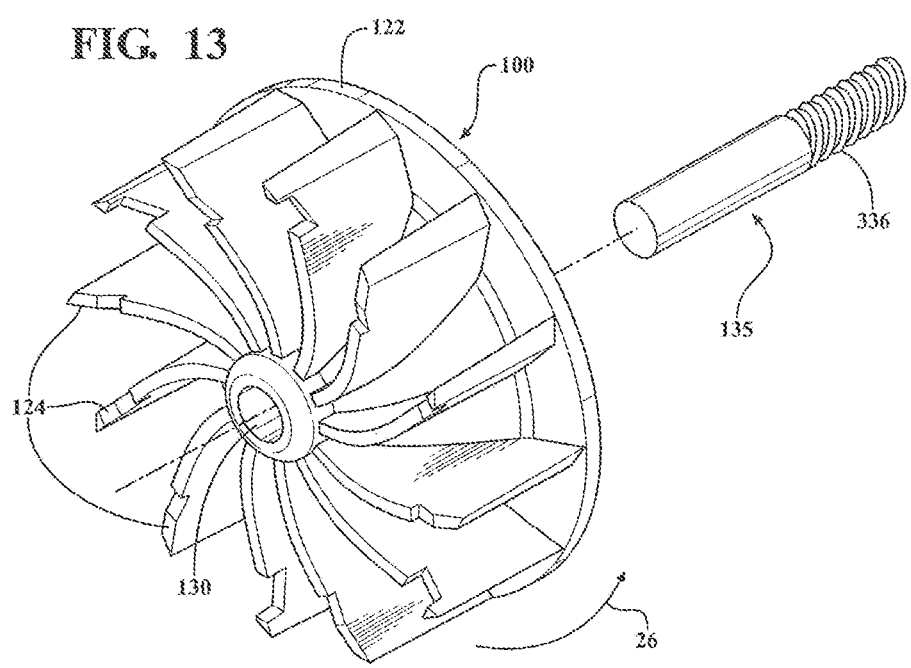
FIG. 13 is a right-side front perspective view of the impeller and its drive shaft.

The cutting tool 34 shown is a circular saw blade 34 that rotates counterclockwise, in the direction of arrow 24, to cut up through the material M. The saw blade 34 could be configured for cutting through wood, metal, concrete, roof tiles, slate, and the like. The saw blade 34, which is of a common type known to those of ordinary skill in the art, is generally circular and defines a central aperture for engaging a rotational saw shaft 116, as best shown in FIG. 6.

The main drive shaft 36 drives the saw shaft 116 through a transmission. The transmission includes a first gear 320 fixed to the main drive shaft 36 and a second gear 322 fixed to the saw shaft 116. The gears 320, 322 are preferably configured to step down rotational speed of the saw shaft 116 compared to the main drive shaft 36. The transmission is disposed in transmission casing 35 (described further below) that covers, secures, and protects its gears 320, 322, with a sealed bearing disposed in transmission casing 35 to support the saw shaft 116. The motor casing 38 and transmission casing 35 together form a drivetrain housing.

A gear plate 51 defines part of the transmission casing 35 and includes a fixed collar 206 that covers and supports the sealed bearing 204, through which extends saw shaft 116 supported thereby. The gear plate 51 includes a base 53 on which outer fixed collar 206 is disposed and from which collar 206 extends laterally outwardly. Saw blade 34 is clamped between an adjacent flange 55 and a bolt or nut 37 that engages threads formed in or on the end of the saw shaft 116 in the well-known manner, thereby rotatably fixing the saw blade 34 to the saw shaft 116.

Referring to FIGS. 2-4B, the motor 32 includes a motor casing 38 that encloses and supports the motor components, e.g., brushes 32a, stator 32b, and rotor 32c. The motor casing 38 defines a motor cavity 39 for receiving the stator 32b and rotor 32c and a pair of cavities 41 for receiving the brushes 32a. The motor components 32a, 32b, 32c are secured in the motor cavities 39, 41 using methods well known to those skilled in the art, such as by fasteners, clips, snap-fits, interference-fits, and the like. The motor casing 38 is preferably formed of metal and includes a vent 40 for exhausting heat generated by the motor 32. In other embodiments, the motor casing 38 could be formed of a rigid plastic material suitable for supporting the motor 32.

Figure 2:
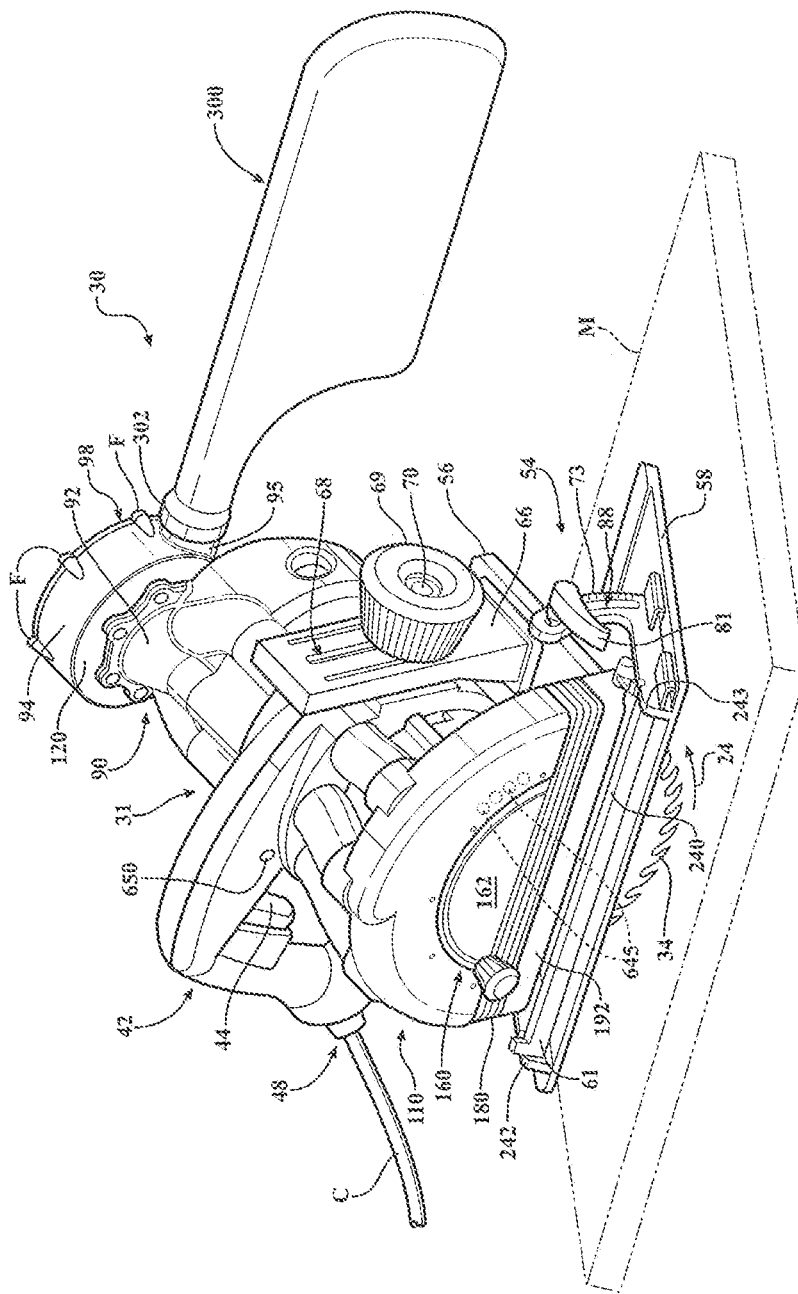
FIG. 2 is a right-side front perspective view of the portable cutting device in an angled state.
Figure 8:
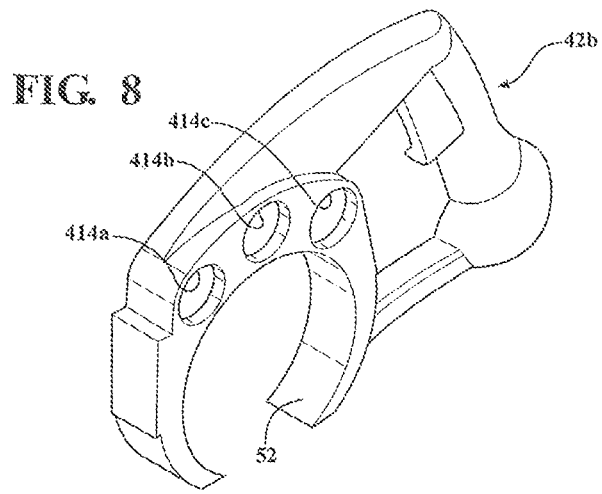
FIG. 8 is a left-side front perspective view of the left-hand handle half.
Figure 9:
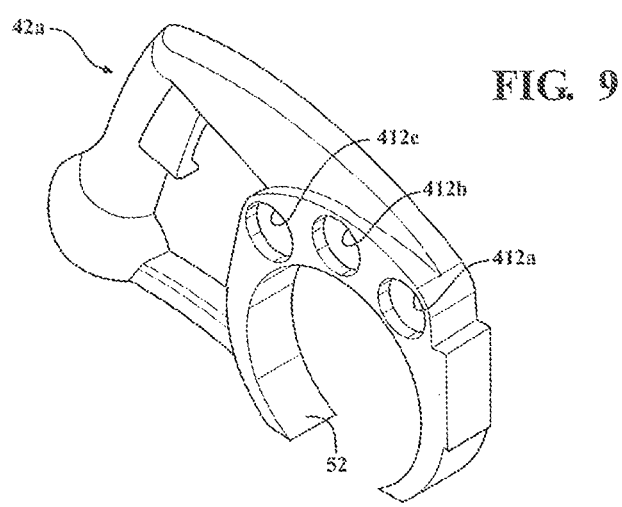
FIG. 9 is a right-side front perspective view of the right-hand handle half.

Referring to FIGS. 2, 8, and 9, a handle 42 is fixed to the motor casing 38. A user grasps and holds the handle 42 to manipulate, maneuver and operate the cutting device 30 during use. A trigger 44 energizes the motor 32 using conventional methods. The handle 42 supports the trigger 44 for actuation by the user. As shown in FIGS. 8 and 9, the handle 42 is preferably formed in two mating halves 42a/42b that are locked together (via adhesive, mating studs/bores, and/or the like). The handle 42 defines a rear cable port 48 for receiving the cord C.

Figure 4A:
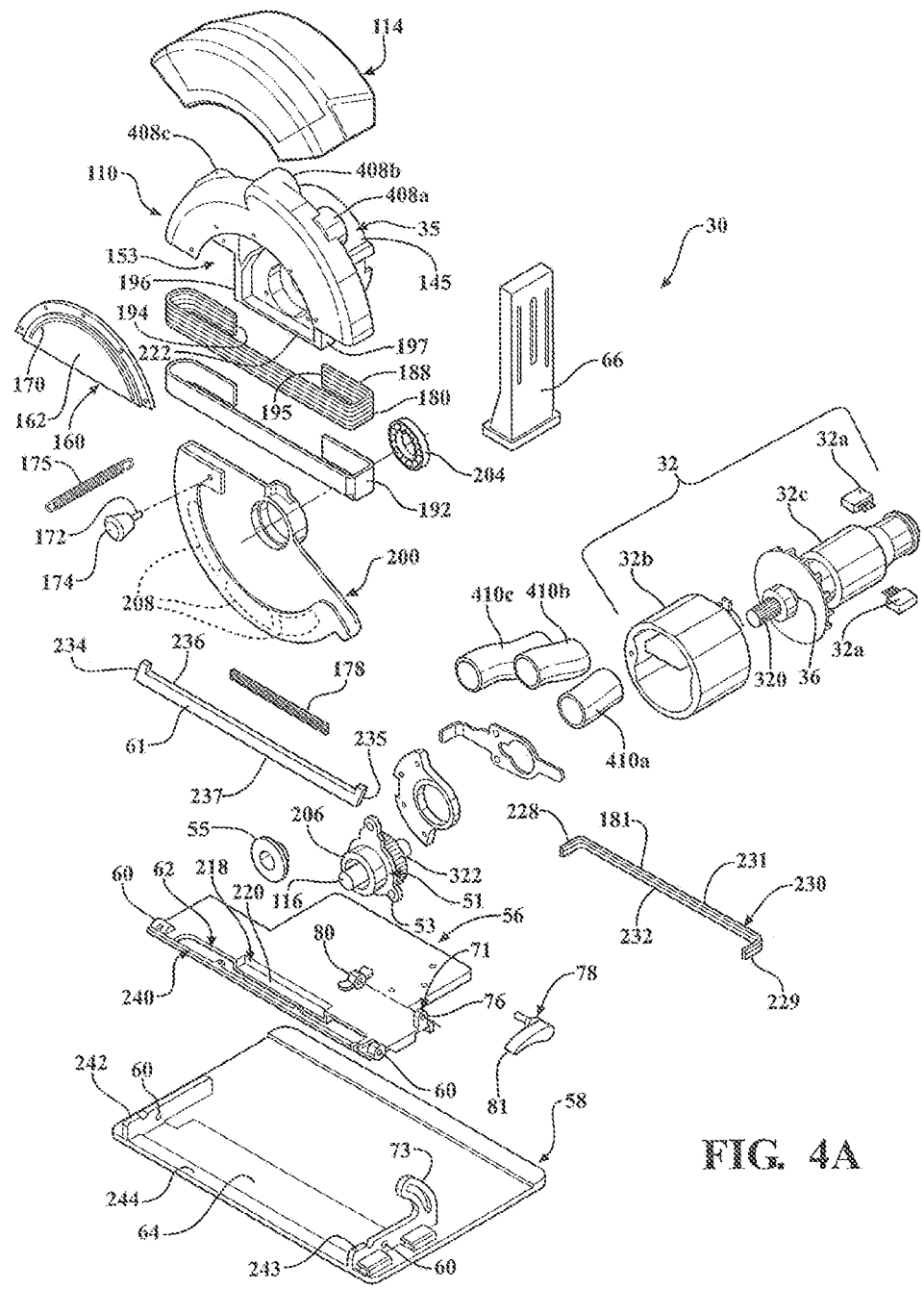
FIGS. 4A and 4B right-side front perspective exploded views of the portable cutting device.
Figure 4B:
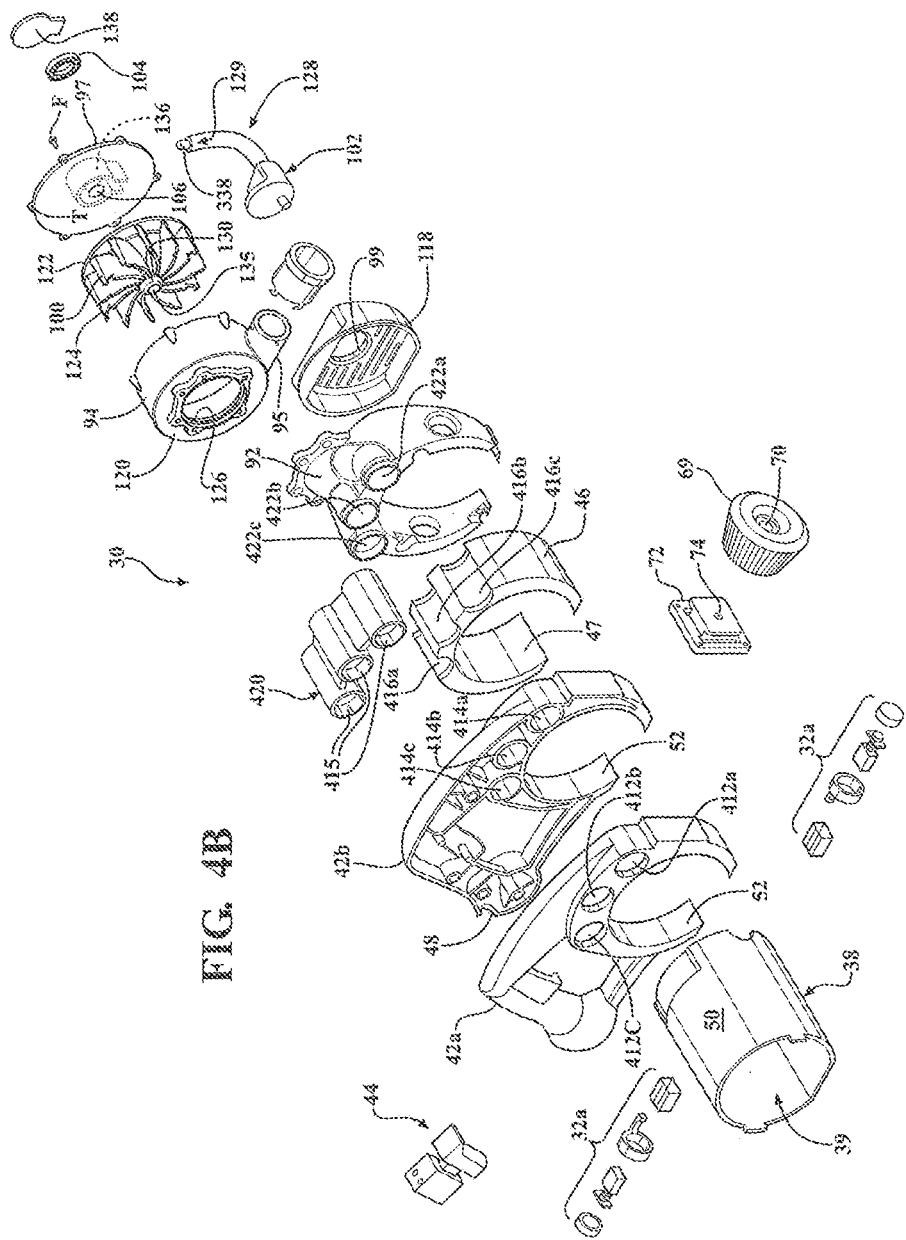
Figure 5:
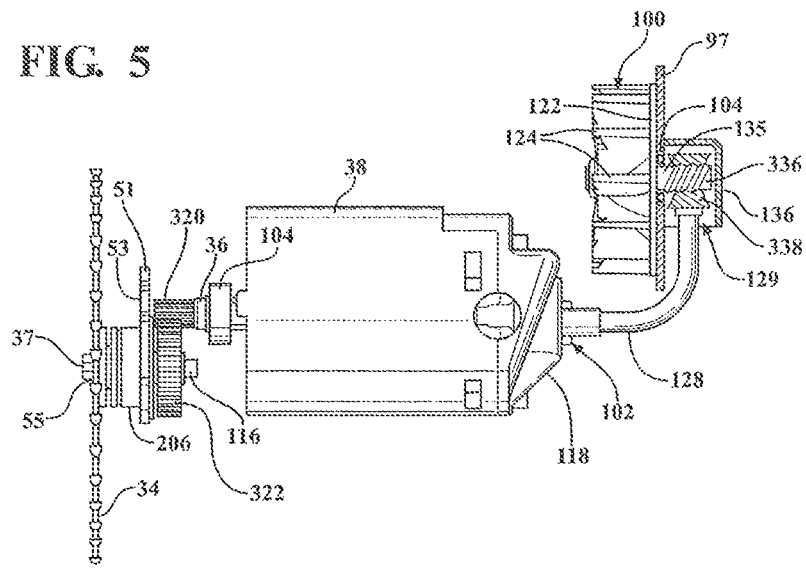
FIG. 5 is a front view of drive train components and blade of the portable cutting device.

The motor casing 38 defines a cylindrical outer surface 50 (see FIG. 4B). The handle 42 defines a cylindrical inner surface 52 that surrounds and engages motor casing surface 50. A suitable adhesive could be used to secure the handle 42 to the motor casing 38. Mid-body motor casing enclosure 46 is disposed on motor casing 38 adjacent to left-hand handle part 42b, and forms part of saw casing 31. Mid-body motor casing enclosure 46 has inner cylindrical surface 47 that surrounds and engages motor casing surface 50. A suitable adhesive could be used to secure enclosure 46 to the motor casing 38.

A lower platform assembly 54 is coupled to the motor casing 38. The lower platform assembly 54 comprises an upper plate or deck plate 56, and a lower plate or base plate 58, which are pivotally coupled together through pivoting or hinged joints 60. The upper plate 56 defines a generally rectangular blade opening 62 for receiving a lower portion of the saw blade 34. The lower plate 58 similarly includes a generally rectangular blade opening 64 for receiving the lower portion of the saw blade 34. The lower plate 58 is adapted to contact and slide along the material M being cut by the saw blade 34.

A depth adjustment block 66 is fixed to the upper plate 56. The depth adjustment block 66 defines an elongated slot 68 for receiving an adjustment screw 70 therethrough. A corresponding depth adjustment bracket 72 (FIG. 4B) is fixed to handle 42. The depth adjustment bracket 72 defines a threaded bore 74 for threadably receiving the adjustment screw 70. The adjustment screw 70 has a graspable head or pommel 69 and a threaded shaft wherein the threaded shaft fits through the elongated slot 68 and threads into the threaded bore 74. When tightened, the graspable head 69 frictionally engages an outer surface of the depth adjustment block 66 to hold the depth adjustment block 66 in one of a plurality of adjustable positions by frictionally securing the depth adjustment block 66 between the depth adjustment bracket 72 and the graspable head 69. As a result, the lower platform assembly 54 can be adjusted for depth relative to the motor casing 38 via the adjustment screw 70.

Referring to FIGS. 1, 2, and 4A, a first angle adjustment block 71 is fixed to the upper plate 56 and a second angle adjustment block 73 is fixed to the lower plate 58. The first angle adjustment block 71 defines a bore 76 for receiving an angle adjustment screw 78. The angle adjustment screw 78 has a threaded shaft and a graspable head 81 configured to form a lever. A wing nut 80 threadably engages the threaded shaft of the angle adjustment screw 78 on a rear surface of the first angle adjustment block 71. Wing nut 80 may be welded or permanently fixed to the first angle adjustment block 71. Alternatively, bore 76 may be threaded to engage the threads of screw 78, with wing nut 80 omitted altogether. The second angle adjustment block 73 defines a second elongated, arcuate slot 88, preferably semicircular in shape and centered about the axis of pivot joint 60, in which is received the threaded shaft of the angle adjustment screw 78. When tightened, the graspable head 81 frictionally engages a front surface of the second angle adjustment block 73 to hold the lower plate 58 in one of a plurality of angular positions by frictionally securing the second angle adjustment block 73 between the first angle adjustment block 71 and the graspable head 81.

The second angle adjustment block 73 is preferably graduated with angular markings 79 such that the lower plate 58 can be pivotally adjusted relative to the upper plate 56 at a known angle therebetween. The angular markings preferably include graduations of 1 degree spanning from zero to 45 degrees. This allows the user to cut the material at a known angle. For instance, the user can cut through wood trim pieces at a 45-degree cut angle.

Figure 10:
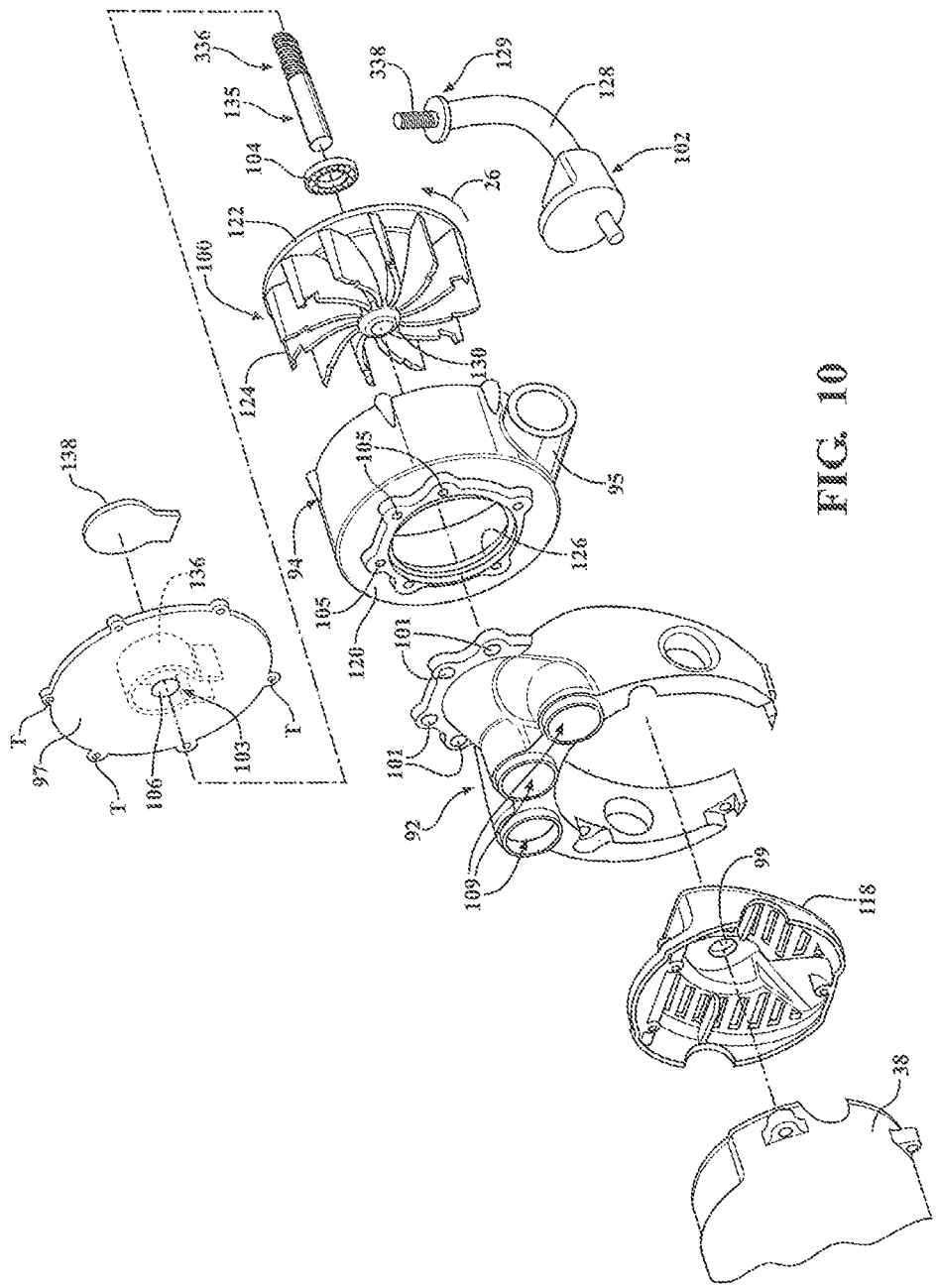
FIG. 10 is a partial right-side front perspective exploded view of vacuum housing-related components of the portable cutting device.
Figure 16:
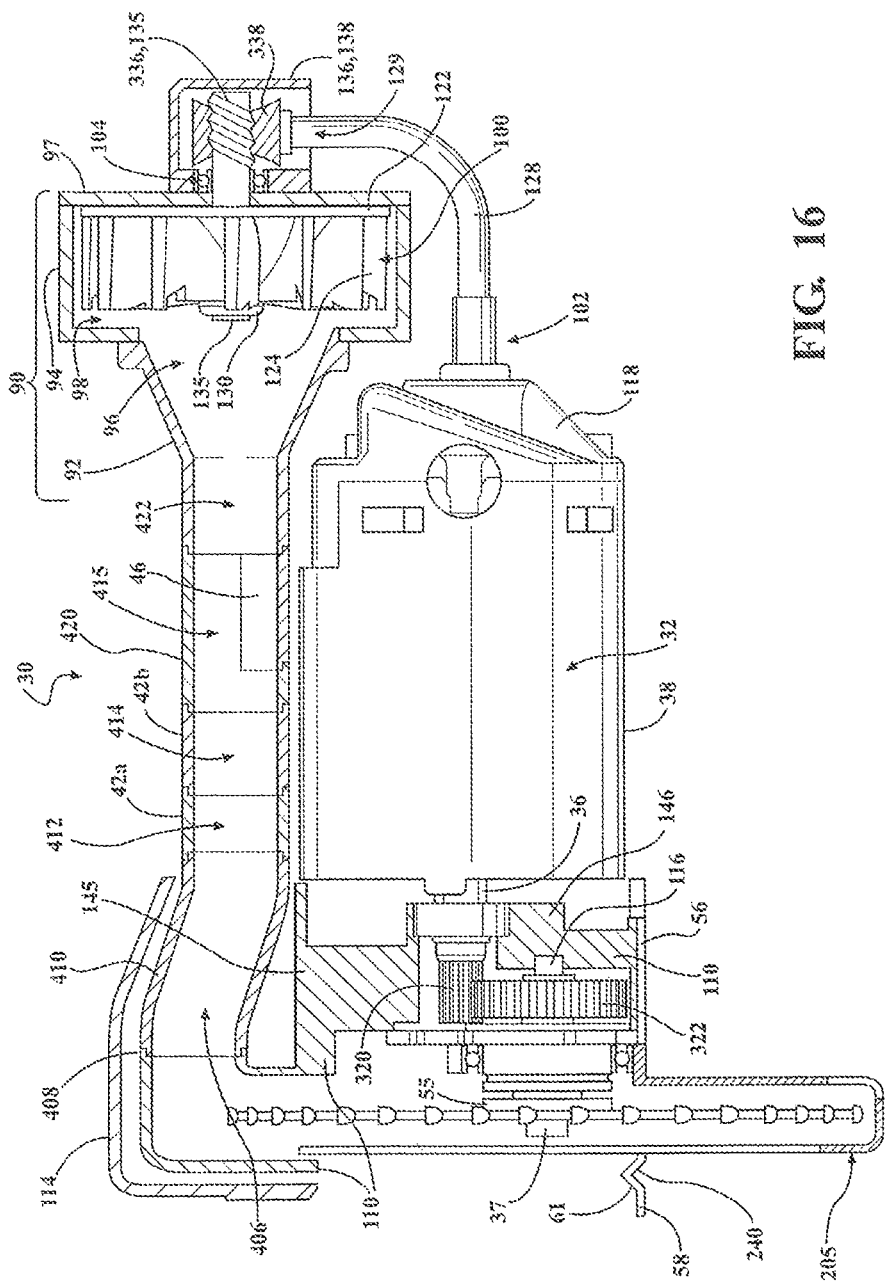
FIG. 16 is a partially sectioned, front view of the drive train components and vacuum conduits of the portable cutting device.

Referring to FIGS. 2, 10, and 16, a vacuum housing 90 is coupled to the motor casing 38 and a blade shroud or upper blade enclosure 110, with bolts. The vacuum housing 90 forms part of saw casing 31 and includes a main housing portion 92, an impeller housing portion 94, and a impeller cover 97. The main housing portion 92 defines a pressure-equalizing chamber 96 (or pressure chamber 96) and the impeller housing portion 94 and impeller cover 97 together define an impeller chamber 98 (see FIG. 16). The generally cylindrical impeller housing portion 94 forms a substantially tangentially extending exhaust port 95. The impeller cover 97 is mounted to the impeller housing portion 94 using fasteners F disposed in through bores T defined in the impeller cover 97 and threaded into bores B in the impeller housing portion 94. Cover 97 has gear housing 136 formed on its exterior planar surface. Housing 136 may, in some embodiments, have a separately attached outer planar cap 138 to facilitate cover 97 being molded with the side walls of housing 136.

A plurality of through bores 101 are also defined through the main housing portion 92 are mated to holes 105 in impeller housing portion 94, which receive fasteners (not shown) to mount the main housing portion 92 to the motor casing 38 at a first end of the motor casing 38.

An impeller 100 is rotatably supported in the impeller chamber 98 on a stub shaft 135, which extends through aperture 106 of cover 97 and into gear housing 136, wherein it is rotatably supported and axially fixed relative to central hub 103 of cover 97, by a sealed bearing 104 mounted on the outward side of hub 103, within gear housing 136. The axially outward end of stub shaft 135 disposed in gear housing 136 has worm gear 336 formed thereon, which is enmeshed with worm 338 provided on the end segment 129 of flexible shaft 128, which is attached to gear housing 136. The motor 32 rotatably drives the impeller 100 through flexible shaft 128 in the direction indicated by arrow 26 to create airflow and corresponding vacuum pressure in the pressure-equalizing chamber 96. The impeller 100 can be formed of metal or plastic materials such as Lexan®, nylon, or other relatively rigid plastic materials.

Referring specifically to FIG. 4B, a bore 99 is defined through end cap 118 of saw casing 31, which is fixed to motor casing 38. Attached to end cap 118 is end segment 102 of flexible drive shaft 128 (see FIG. 2). Drive shaft end segment 102 is adapted for receipt into bore 99 and rotatably fixed to motor drive shaft 36. Flexible drive shaft 128, which includes rotating, torque-carrying flexible cable disposed within a flexible surrounding, nonrotating casing or sheath, is of a type well-known in the power transmission art that is available from a number of sources such as, for example, S.S. White Technologies, Inc. of Piscataway, N.J. or Suhner Manufacturing, Inc. of Rome, Ga.

Figure 11:
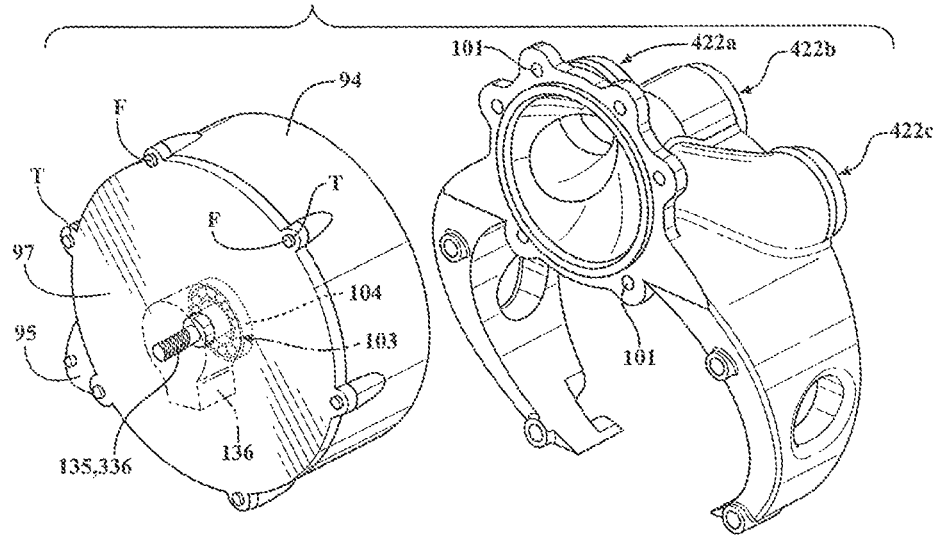
FIG. 11 is a left-side rear perspective exploded view of the vacuum housing of the portable cutting device.
Figure 12:
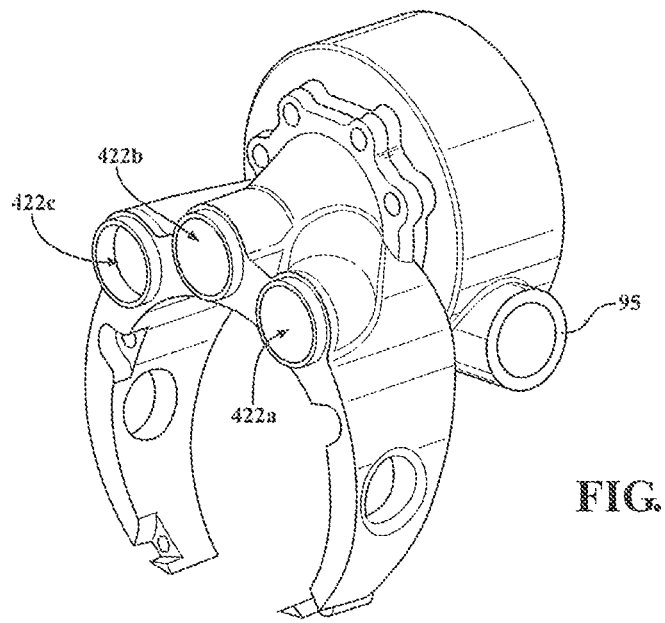
FIG. 12 is a right-side front perspective view of the vacuum housing of the portable cutting device.

Referring to FIGS. 10-12, the impeller 100 has circular plate 122 that superposes the inside planar surface of cover 97, and to which a plurality of blades 124 or fins are interconnected. Circular plate 122 has a central hub 130 extending normally therefrom to which blades 124 are also interconnected, and from which they extend radially outwardly. Hub 130 defines a central bore into which stub shaft 135 is inserted, with impeller 100 and stub shaft 135 rotatably and axially fixed together. Impeller 100 and shaft 135 may be interfixed through an interference fit, clamped engagement, or through fasteners, for example.

Planar wall 120 of housing portion 94 defines an aperture 126 that approximates a size of the pressure-equalizing chamber 96 such that the pressure-equalizing chamber 96 opens directly into the plurality of blades 124. The pressure-equalizing chamber 96 opens into the impeller chamber 98 in a direction generally transverse to, and preferably perpendicular to, plate 122 of impeller 100.

Referring specifically to FIG. 16, a plurality of vacuum conduits 406 are disposed about the saw casing 31 and extend laterally therealong, between saw blade shroud or upper enclosure 110 and main housing portion 92 of vacuum housing 90. In the depicted embodiment, three vacuum conduits 406 are utilized. The vacuum conduits 406 communicate with the pressure-equalizing chamber 96 through openings 109 in the main housing portion 92 (see FIG. 10). It should be appreciated that more or fewer vacuum conduits 406 could be employed. The vacuum conduits 406 extend between upstream ends located at enclosure 110, and downstream ends located at main housing portion 92. The pressure-equalizing chamber 96 assists in equalizing the vacuum or suction pressure drawn in each of the vacuum conduits 406 by providing a volume of space, upstream of the impeller 100 and downstream of the vacuum conduits 406, in which a suction pressure can be established.

In the depicted embodiment, the vacuum conduits 406 are formed in multiple segments defined by casing components or other components that define the conduits. These components may be connected together by being sealably interfitted, or through the use of adhesive and/or couplers, and/or the like. Referring to FIG. 16, the sequentially encountered sections of conduits 406 along the general direction of airflow are described as duct heads 408, tubes 410, right-hand handle passages 412, left-hand handle passages 414, mid-body passages 415, and vacuum housing passages 422. Mid-body passages 415 are defined by the cooperating semi-cylindrical surfaces 416 formed on mid-body motor casing enclosure 46 and semi-cylindrical surfaces defined by mid-body window 420 attached to enclosure 46. Passages 422 in main housing portion 92 of vacuum housing 90 define individual outlets of vacuum conduits 406 that each open into pressure equalization chamber 96.

The vacuum conduits 406 preferably have a generally circular cross-section, but their cross-sections may instead be generally rectangular in shape or other shapes, and can vary in cross-sectional shape over their lengths. Each of the vacuum conduits 406 preferably has a cross-sectional area at the blade shroud or upper enclosure 110 that is larger than the cross-sectional area at the main housing portion 92. The cross-sectional area may taper gradually from the upper enclosure 110 to the main housing portion 92. Three vacuum conduits 406 are illustrated and include a first or leading vacuum conduit, a second or center vacuum conduit, and a third or trailing vacuum conduit.

Referring to FIGS. 2 and 15, the upper enclosure 110 at least partially encloses an upper portion of the saw blade 34, and defines an upper section of a debris accumulation chamber 112 (see FIG. 15). The upper enclosure 110 has a generally semi-circular shape that approximates the shape of the saw blade 34. The upper enclosure 110 is generally U-shaped in cross-section taken in planes containing the axis of rotation of saw shaft 116, except at the openings to vacuum conduits 406.

The inlets to the first and second vacuum conduits are disposed at a front section of the upper enclosure 110. The inlet to the third vacuum conduit is disposed at a rear section of the upper enclosure 110. The front section is defined as the front half of the upper enclosure 110, while the rear section is defined as the rear half of the upper enclosure 110. The first vacuum conduit is preferably located at the frontmost location on the front section to collect debris at the front of the debris accumulation chamber 112. The third vacuum conduit is preferably located on the rear section to collect debris at the rear of the debris accumulation chamber 112. Together the vacuum conduits 406 define separate vacuum paths for the debris.

A plurality of duct heads 408a, 408b, 408c are integrally formed with the upper enclosure 110 (or alternatively can be formed separately), and define inlets to their respective conduits 406. The duct heads 408a, 408b, 408c each have a surrounding collar adapted to receive and sealably engage the respective upstream ends of tubes 410a, 410b, 410c. The upstream ends of tubes 410a, 410b, 410c may form an interference fit with the collars or be adhesively bonded to the collars.

An inner side 150 of the upper enclosure 110 is mounted to the transmission casing 35 to close the debris accumulation chamber 112 on the inside. More specifically, inner side 150 is integrally connected to an outer rim 145, which surrounds intermeshed gears 320, 322 of transmission, and integral wall 146. Gear plate 51, outer rim 145, and wall 146 together define transmission casing 35. In the blade-surrounding portion of enclosure 110, the inner side 150 and an outer side 152 of upper enclosure 110 are interconnected by integral, semi-circular shoulder 155.

Outer side 152 of the upper enclosure 110 defines a semicircular opening 153 in which is disposed a side window 160 that closes the opening 153 and the outward side of debris accumulation chamber 112. The side window 160 includes a transparent section 162 formed of transparent plastic and has a semicircular outer periphery 164 in which is a circumferential distribution of holes 166 (see FIG. 18). The transparent section 162 allows the user to view the saw blade 34. The outer periphery 164 interfaces and abuts the inner surface of outer side 152 along the periphery of opening 153 that is provided with holes 168 that correspondingly align with holes 166. Fasteners (not shown) extend through aligned holes 166, 168 to secure window 160 to enclosure 110. Side window 160 includes arcuate slot 170 centered abut the axis of rotation of blade 34. The slot 170 is adapted to receive shaft 172, the end of which is fixed to outer side 205 of manually retractable lower blade guard 200. The outward end of shaft 172 is provided with knob 174 which may be grasped by the operator to manually move shaft 172 along slot 170 to retract lower blade guard 200 into upper blade enclosure 110 to expose the edge of blade 34, which is desirable for making plunge cuts into the surface of material M, rather that from an edge thereof. Lower blade guard 200 may be rotatably biased into its extended position in which it shields the edge of blade 34, by a tension spring 175 operably engaged with enclosure 110 and guard 200, in a conventional manner well-known in the circular saw art.

Upper blade enclosure 110 defines bottom edge 182 and side window 160 defines bottom edge 176. Bottom edges 176 and 182 are substantially flush and lie in a plane. Referring to FIGS. 4A and 18-20, a flexible main bellows 180 interconnects bottom edges 176, 182 along a corresponding upper rim or edge 188. The flexible bellows 180 is flexible and expandable between compressed and extended states to accommodate differing cutting depths, i.e., when the lower platform assembly 54 is raised and lowered relative to blade 34 to provide more or less blade cutting depth. Flexible main bellows 180 has opposite longitudinal ends 194, 195 that face each other, and slidably engage respectively interfacing, parallel planar sides 196, 197 of blade enclosure 110. Bellows 180 has lower rim or edge 186 that is interconnected with corresponding upper rim or edge 190 of transparent blade window 192. Blade window 192 has the same general shape as main bellows 180, and may be molded of a suitable transparent, substantially rigid plastic material, to allow the operator to view the cut line. Bosses 193 are formed in blade window 192 through which fasteners F extend to secure blade window 192 to deck plate 56. Bottom edge 198 of blade window 192 is closely received into blade opening 62, and its outward side has a shoulder 199 that abuts deck plate 56 along the outer longitudinal edge of opening 62. Blade window 192 has opposite longitudinal ends 212, 213 that face each other, and abut and seal against respectively interfacing, parallel planar sides 196, 197 of blade enclosure 110.

More particularly, upper rim 188 of main bellows 180 may define a peripheral groove adapted to receive the bottom edges 176, 182 of side window 160 and upper enclosure 110, and lower rim 186 of main bellows 180 may similarly define a peripheral groove adapted to receive upper edge 190 of transparent blade window 192. The bottom edges 176, 182 and the upper edge 190 may be press-fitted and adhesively sealed in the respective peripheral groove of bellows 180. In one embodiment, the flexible bellows 180 has an accordion shape. In other embodiments, the flexible bellows 180 is formed of a stretchable plastic material capable of stretching greater than 100% such as polyurethane. The flexible bellows 180 is also preferably transparent.

Additionally, the portion of the upper surface of deck plate 56 immediately below transmission casing 35 of enclosure 110 and along the longitudinal inward edge of blade opening 62 is recessed below the adjacent portions of the deck plate upper surface. The recessed portion 218 of deck plate 56 defines a planar floor 220 that is parallel with planar bottom surface 222 of transmission casing 35, which extends between its opposed sides 196, 197. Extending the entire length of recessed portion 218 and surface 222 is rear bellows 178. Top surface 224 of rear bellows 178 is sealably attached to transmission casing bottom surface 222; bottom surface 226 of rear bellows 178 is sealably attached to floor 220. Thus, the blade-containing space between blade opening 62 in deck plate 56 and chamber 112 of upper blade enclosure 110, is substantially sealed against air leakage through its enclosing walls.

The inward longitudinal edge of blade opening 64 in base plate 58 is laterally distanced from blade 34 to an extent that it is positioned on the side of recessed portion 218 that is opposite the blade 34. Extending the length of blade opening 64 is U-shaped lower bellows 181, which may be of a material similar to main bellows 180. The legs 228, 229 of lower bellows 181 extend substantially perpendicularly from its elongate body 230; top and bottom surfaces 231, 232 of lower bellows 181 are respectively sealably attached to the interfacing, superposed surfaces of deck plate 56 and base plate 58. As lower platform assembly 54 is adjusted about pivoting joints 60, to angle deck plate 56 and base plate 58 between zero and 45 degrees, lower bellows body portion 230 is expanded and contracted, while at the terminal ends of legs 228, 229 bellows 181 remains compressed to a substantially consistent degree regardless of saw blade angle. Thus, bellows 181 is arranged to enclose a portion of the space between plates 56, 58 into which blade opening 64 communicates.

On the outward lateral side of blade 34, elongate, substantially planar slider plate 61 extends along the entire length of blade opening 64 in base plate 58. The opposed ends 234, 235 of slider plate 61 are pivotally attached to deck plate 56 near the upper slider plate edge 236, which slidably abuts elongate sealing flange 240 integrally formed on the deck plate and projecting upwardly and outwardly from its upper planar surface at an angle, away from blade opening 62. The opposed ends 234, 235 of slider plate 61 are closely fitted between a pair of upstanding planar sealing flanges 242, 243 located at opposite longitudinal ends of blade opening 64. The lower slider plate edge 237 is in sliding engagement along its length with the adjacent planar sealing surface 244 of base plate 58 located between its upstanding flanges 242, 243. As slider plate 61 pivots relative to deck plate 56, with relative angular movement between deck plate 56 and base plate 58 about pivot joints 60, slider plate lower edge 237 sealably slides along base plate sealing surface 244, and slider plate ends 234, 235 sealably slide along the adjacent sealing surface of their respective flanges 242, 243. The opposed ends 234, 235 of slider plate 61 may be slidably linked, for example, via pin-in-slot joints, with flanges 242, 243, to ensure sealing engagement between slider plate lower edge 237 and base plate sealing surface 244. Alternatively, slider plate 61 may be pivotably biased relative to deck plate 56, for example by a torsion spring (not shown), to ensure sealing engagement between slider plate lower edge 237 and base plate sealing surface 244. Alternatively, slider plate 61 may rely on gravity and/or the air pressure differential between its opposite planar sides during saw operation to ensure sealing engagement between slider plate lower edge 237 and base plate sealing surface 244. Thus, the blade-containing space between blade opening 64 in base plate 58 and chamber 112 of upper blade enclosure 110, is also substantially sealed against air leakage at locations below deck plate 56. The above-described sealing of the blade containing space against the influx of air leakage downstream of (i.e., above) blade opening 64 in lower plate 58 helps to maintain general sealing of the debris accumulation chamber 112 when the lower plate 58 is pivoted for angled cuts. In other words, during saw operation a working vacuum pressure is maintained in the debris accumulation chamber 112 to draw the debris out of the debris accumulation chamber 112 at all cutting angles and depths.

Referring to FIGS. 4A, 17A, and 17B, a lower blade guard 200 is pivotally mounted to the fixed collar 206 of the gear plate 51. The lower blade guard 200 includes an inner side 203 and an outer side 205. The lower blade guard 200 includes a hub 202 on the inner side 203 for supporting a sealed bearing 204. The sealed bearing 204 is disposed over the fixed collar 206 and is fixed to the fixed collar 206. The saw shaft 116 rotates within bearing 204 of the fixed collar 206. Thus, the fixed collar 206 is fixed from rotation. As a result, the lower blade guard 200 pivots about the fixed collar 206 via the sealed bearing 204. The lower blade guard 200 at least partially encloses a lower portion of the saw blade 34. The lower blade guard 200 also defines a plurality of openings 208 in the inner side 203 and part of the shoulder 210. When guard 200 is fully retracted, the openings 208, which generally correspond in size and location to the inlets to conduits 406 in the upper enclosure 110, become aligned with the duct heads 408a, 408b, 408c. A bottom shoulder 210 spaces the inner side 203 from the outer side 205.

This lower blade guard 200 rotates further into the upper enclosure 110 as the saw blade 34 cuts through the material M in a conventional manner. Referring to FIG. 15, when the lower blade guard 200 is rotated into the upper enclosure 110, the openings 208 assist in providing aligned airflow paths to carry the debris to the vacuum conduits 406. This is best illustrated in FIG. 15. When the lower blade guard 200 is rotated into the upper enclosure 110, it still surrounds the saw blade 34, just now at an upper portion of the saw blade 34. As a result, there is a need for airflow from the debris accumulation chamber 112 to easily penetrate through the lower blade guard and remain relatively unimpeded as it continues to the vacuum conduits 406, and openings 208 assist in this effort.

Referring back to FIGS. 1 and 2, a collection bag 300 is releasably mounted to the exhaust port 95 with a clamp or collet 302. In other embodiments, the collection bag 300 can be mounted with a cinching string, elastic band, and the like. The collection bag 300 is preferably flexible, collapsible, and easily disposable. In other embodiments, the collection bag 300 is washable for coarse work such as cutting materials like wood. The particular type of collection bag 300 utilized to catch and collect fine debris such as that produced in drywall cutting are in common use in the industry and are well known in the art. The collection bag 300 is generally porous to allow airflow therethrough, while still trapping debris deposited in the collection bag 300 during operation.

Figure 3:
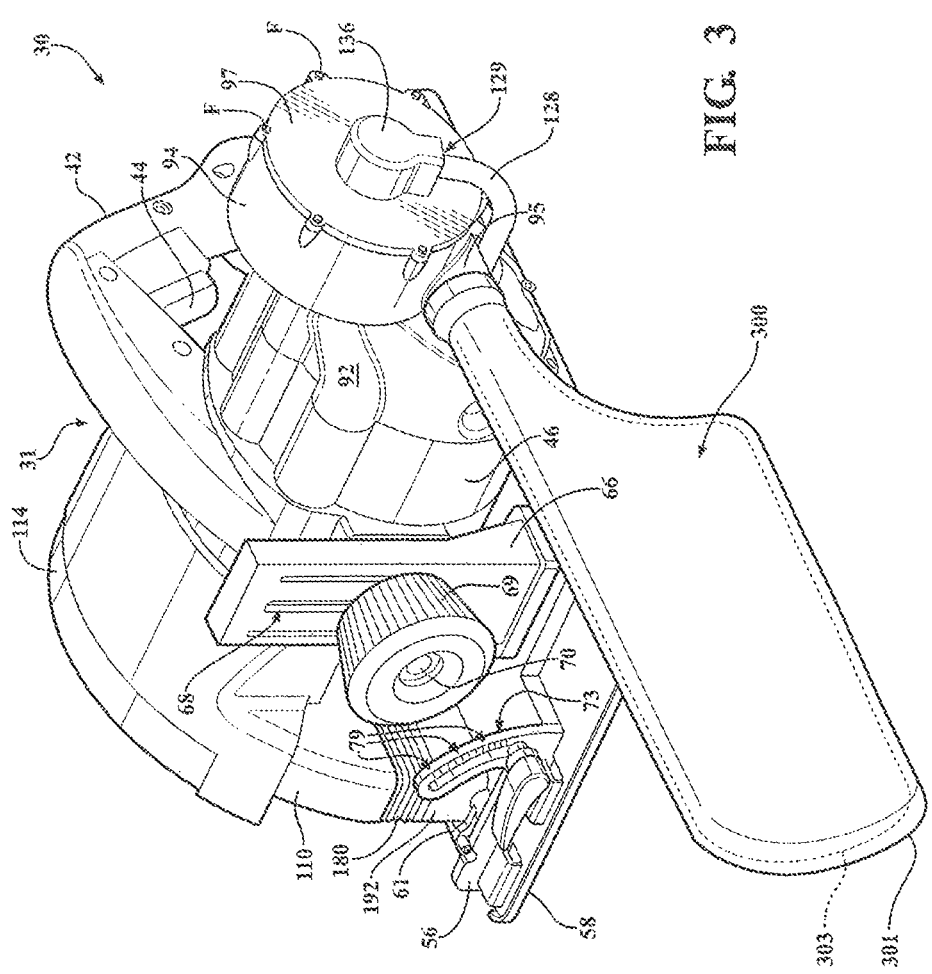
FIG. 3 is a left-side front perspective view of the portable cutting device in an angled state.

In one embodiment, shown in FIG. 3, the debris collection assembly includes an outer container 301 and an inner container 303, both clamped about the exhaust port 95 and preferably being bags that are flexible and collapsible. In this embodiment, the inner bag 303 may be formed of disposable filter materials such as a Style C Genuine Multi-Filter bag for an Electrolux Tank. The inner bag 303 may be formed with a maximum pore size configured to prevent pass-through of particle diameters of 100 microns or less, more preferably 10 microns or less, most preferably 5 microns or less, and even some embodiments capable of preventing pass through of particles with diameters of 1 microns or less. The outer bag 301 may be fabricated from a synthetic or natural cloth material and be formed with pore sizes configured to prevent pass through of larger material such as wood chips, etc., preferably on the order or 0.5 inches in diameter or less, 0.1 inches in diameter or less, and preferably from about 100 microns to about 0.1 inches in diameter.

Figure 20:
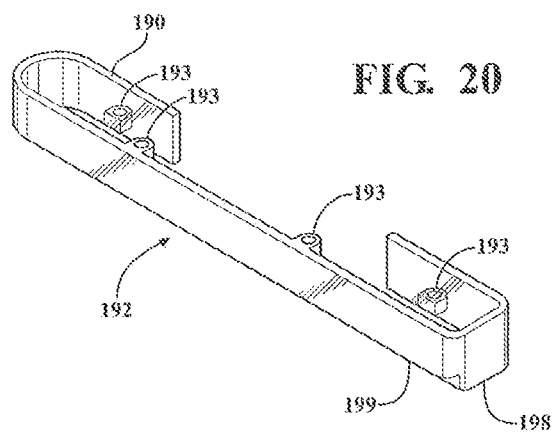
FIG. 20 is a right-side front perspective view of the transparent blade window.
Figure 21:
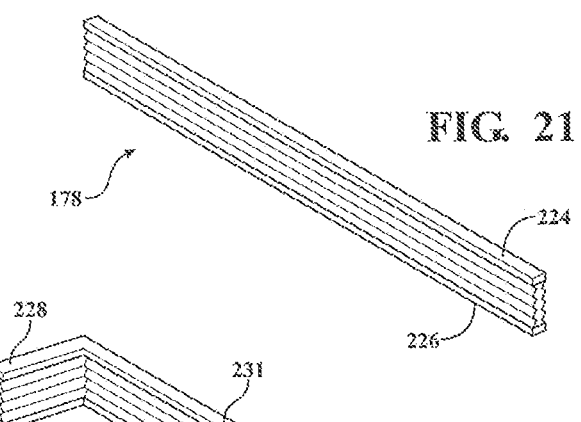
FIG. 21 is right-side front perspective view of the rear bellows.
Figure 22:
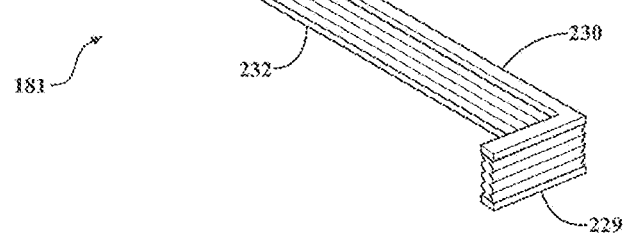
FIG. 22 right-side front perspective view of the lower bellows.
Figures 24A, 24B:
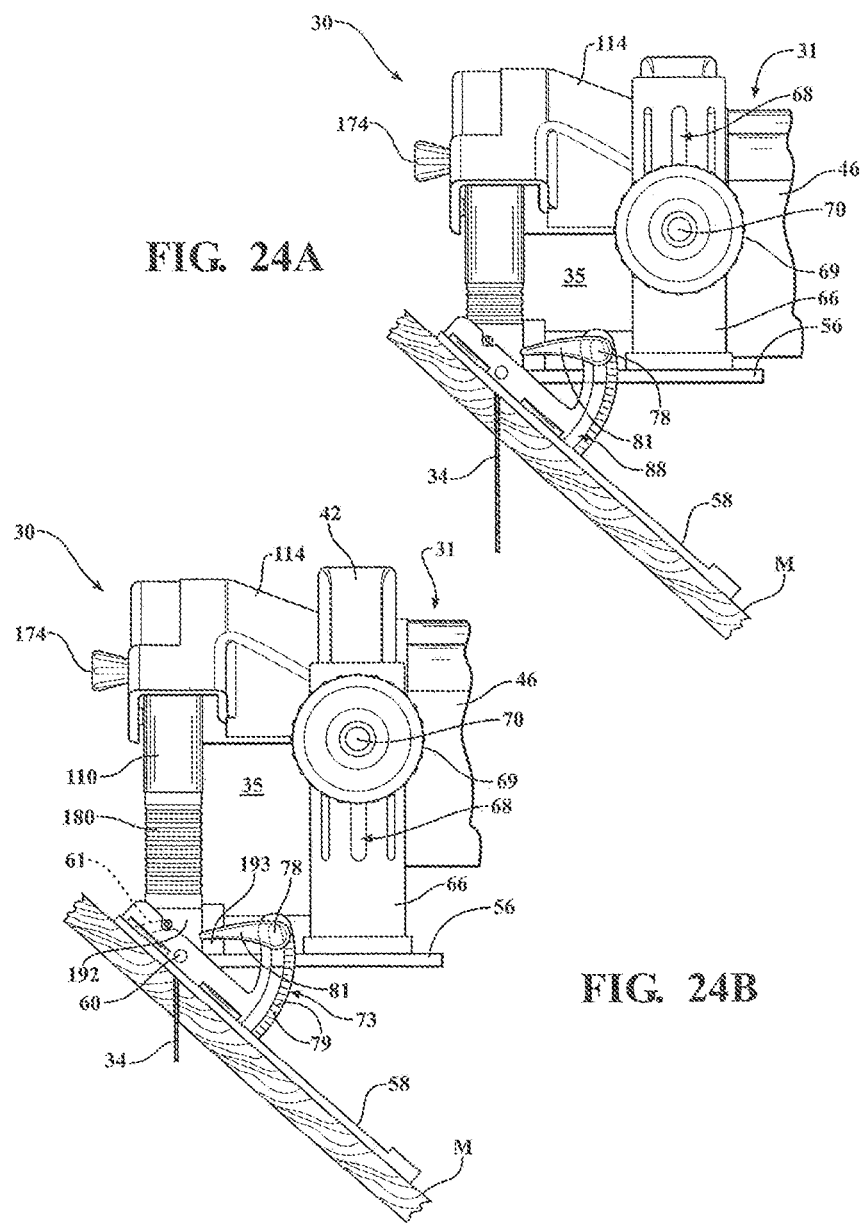
FIGS. 24A and 24B are fragmented front views of the portable cutting device in a 45-degree angled state, at comparatively greater and lesser blade depth positions, respectively.
Figure 26:
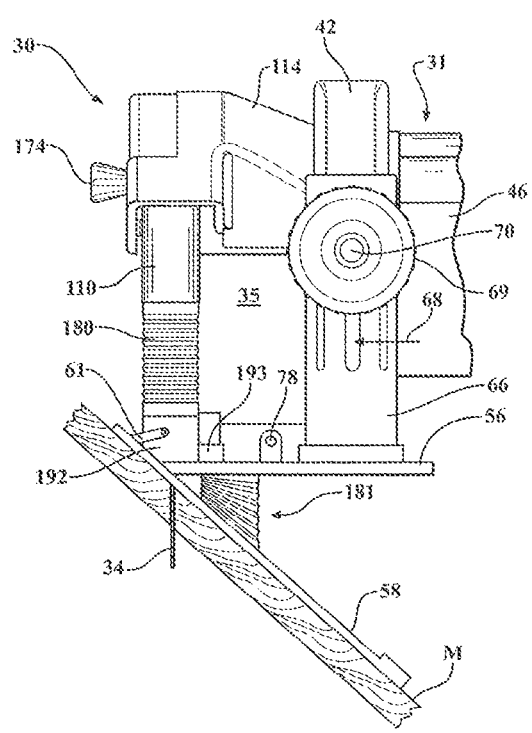
FIG. 26 is a fragmented front view similar to that of FIG. 24B, but with a portion of the base plate removed to reveal the lower bellows.

During operation, the motor 32 drives the main drive shaft 36 (and flexible shaft end segment 102). Referring to FIG. 20, the first gear 320 is fixed to the main drive shaft 36, while the second gear 322 is fixed to the saw shaft 116. The gears 320, 322 are preferably configured to step down rotational speed of the saw shaft 116 compared to the main drive shaft 36.

As the motor 32 drives the impeller 100, the impeller 100 rotates to generate airflow. This airflow creates a vacuum or suction pressure in the debris accumulation chamber 112 to draw debris from the debris accumulation chamber 112 into the vacuum conduits 406. From the vacuum conduits 406, the debris travels into the pressure-equalizing chamber 96 and then through the inside plate 120 of the impeller 100. The impeller 100 then directs the debris out of the exhaust port 95 and into the collection bag 300.

The saw blade 34 preferably has a plurality of teeth arranged circumferentially about a perimeter of the saw blade 34. Each of the teeth includes a flat section protruding radially outwardly from the main body of the saw blade 34 that has a width that generally approximates the width of the main body and is usually integrally formed with the main body out of a metallic material such as steel or composites thereof. In some embodiments, the saw blade 34 may be 10 inches or less in diameter, preferably between 6 inches and 10 inches, and more preferably between 6 inches and 8 inches. The width of the saw blade 34 is 3 mm or less, more preferably 1.5 mm or less, and most preferably between about 0.2 mm and 2.0 mm. Other embodiments may have varying sizes depending on the particular application or material to be cut.

Each of the teeth has a kerf face that defines the kerf formed by the saw blade 34 during cutting. The blade's kerf face can take on many different shapes depending on the particular cutting application. In some embodiments, the kerf is 2 mm or more, while in other embodiments, the kerf is 2 mm or less. In one particular embodiment, the kerf is about 2 mm. In some embodiments carbide tips define the blade's kerf face, with the carbide tip fixed to the flat section in a conventional manner, such as by welding, adhesive, etc. A gullet is defined between the teeth. The gullet for a saw blade of about 10 inches in diameter or less is preferably less than 1 inch, more preferably less than 0.75 inches, and most preferably between 0.25 inches and 0.75 inches. For larger diameter saw blades, the gullet may be deeper.

Each of the teeth may also include an embossed portion on opposing sides of the flat section that preferably extends from the carbide tip onto the main body of the saw blade 34. The height of the two embossed portions and width of the flat section in total preferably equal or are less than the kerf width of the teeth, more preferably less than about 95% of the kerf width of the teeth. The maximum height of each of the embossed portions in one embodiment may be 1 mm or less, more preferably 0.5 mm or less, and most preferably between 0.1 mm and 0.5 mm. In different applications, the height may differ.

The dimensions of the various elements can be varied according to the uses and designs of the cutting device 30. For example, the debris accumulation chamber 112 may be from 0.5 inches to 10 inches in width. In some embodiments, the upper enclosure 110, blade window 132, side window 160, and bellows 180 may be unitary and formed in one-piece of plastic. The motor casing 38, vacuum housing 90, and upper enclosure 110 could also be formed in one-piece and could be formed of metal, plastic, or any combinations thereof. Additionally, the vacuum conduits 406 (also referred to as debris carrying ducts 406) could be integrated into a single duct (not shown) partitioned into separate paths to accomplish the same objectives as the present invention.

As additional enhancements, lighting could be provided inside the debris accumulation chamber 112. Referring to FIGS. 2 and 14, one or more LEDs 645 could also be positioned inside the debris accumulation chamber 112 and actuated by a separate switch 650. In FIG. 14, the LEDs 645 are mounted inside the upper enclosure 110 on the front side. Additional LEDs 645 could be mounted on the opposite side of the upper enclosure 110. The LEDs could be glued to the upper enclosure 110, snap fit into sockets integrally formed in the upper enclosure, or otherwise fastened to the upper enclosure 110 using screws, rivets, and the like. The LEDs 645 could be configured to automatically operate (light up) when the motor 32 is actuated by switch 44, or could be separately operated by switch 650 (see FIG. 2). Further, a laser guide 700 could be incorporated in the cutting device 30. In FIG. 1, the laser guide 700 is mounted to an outside of the upper enclosure 110 along the upper shoulder 155. Like the LEDs, the laser guide 700 could be configured to automatically operate when the motor is actuated by switch 44, or could be separately operated by switch 702. The laser guide 700 could also be separately battery powered.

While the invention has been described with reference to exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment(s) disclosed herein, but that the invention will include all embodiments falling within the scope of the appended claims.

What is claimed is:

1. A cutting device comprising:
   a motor for driving a cutting blade to cut material;
   a shroud configured to at least partially enclose the cutting blade, said shroud defining a debris chamber into which material debris generated by the cutting blade during cutting is received;
   a source of vacuum in fluid communication with said debris chamber;
   a vacuum conduit defining a vacuum path extending between said debris chamber and said source of vacuum;
   a platform assembly coupled to said shroud and including:
   an upper member defining an upper opening for receiving the cutting blade; a lower member defining a lower opening for receiving the cutting blade, said lower member being movable between a plurality of cut depth positions relative to said shroud; and a pivot joint coupling said lower member to said upper member wherein said lower member is pivotable between a plurality of cut angle positions in which a relative angle between said upper member and said lower member is varied; and a sealing arrangement positioned about and surrounding said lower opening and configured to seal about said lower opening to maintain a seal between said upper member and said lower member as said lower member pivots relative to said upper member between said plurality of cut angle positions to reduce air leakage into said shroud from above said lower opening between said cut depth positions and said plurality of cut angle positions.

2. The cutting device of claim 1 wherein said platform assembly defines a gap that varies in height between said upper member and said lower member as said lower member pivots relative to said upper member between said plurality of cut angle positions, said sealing arrangement positioned in said gap.

3. The cutting device of claim 1 wherein said upper member includes a deck plate and said lower member includes a base plate pivotally attached to said deck plate.

4. The cutting device of claim 1 wherein said sealing arrangement includes a plurality of sealing walls dimensioned to reduce air leakage as said lower member pivots relative to said upper member.

5. The cutting device of claim 4 wherein said plurality of sealing walls includes a pair of sealing flanges attached to said lower member and extending upwardly therefrom.

6. The cutting device of claim 4 wherein said plurality of sealing walls substantially surround said upper opening on at least three sides throughout an operating range of cut angle positions.

7. The cutting device of claim 4 wherein said plurality of sealing walls substantially reduce air leakage above said lower opening throughout an operating range of cut angle positions.

8. The cutting device of claim 1 including a vacuum housing wherein said source of vacuum includes a vacuum impeller coupled to said motor and disposed in said vacuum housing, said vacuum housing defining a vacuum chamber in fluid communication with said debris chamber.

9. The cutting device of claim 8 including a collection container wherein said vacuum housing includes an exhaust port for directing the material debris into said collection container.

10. The cutting device of claim 1 including a second vacuum conduit defining a second vacuum path extending between said debris chamber and said source of vacuum.

11. A cutting device comprising:
a cutting blade;
a motor coupled to said cutting blade to drive said cutting blade;
a shroud at least partially enclosing said cutting blade, said shroud defining a debris chamber into which material debris generated by said cutting blade during cutting is received;
a source of vacuum in fluid communication with said debris chamber;
a vacuum conduit defining a vacuum path extending between said debris chamber and said source of vacuum;
a platform assembly coupled to said shroud and including: an upper member defining an upper opening for receiving said cutting blade; a lower member defining a lower opening for receiving said cutting blade wherein said cutting blade extends below said lower member to cut material, said lower member being movable between a plurality of cut depth positions relative to said shroud; and a pivot joint coupling said lower member to said upper member wherein said lower member is pivotable between a plurality of cut angle positions in which a relative angle between said upper member and said lower member is varied; and
a sealing arrangement positioned about and surrounding said lower opening and configured to seal about said lower opening to maintain a seal between said upper member and said lower member as said lower member pivots relative to said upper member between said plurality of cut angle positions to reduce air leakage into said shroud from above said lower opening between said cut depth positions and said plurality of cut angle positions.

12. The cutting device of claim 11 wherein said platform assembly defines a gap that varies in height between said upper member and said lower member as said lower member pivots relative to said upper member between said plurality of cut angle positions, said sealing arrangement being positioned in said gap.

13. The cutting device of claim 11 wherein said sealing arrangement includes a plurality of sealing walls operable to reduce air leakage as said lower member pivots relative to said upper member.

14. The cutting device of claim 13 wherein said plurality of sealing walls includes a pair of sealing flanges attached to said lower member and extending upwardly therefrom.

15. The cutting device of claim 13 wherein said plurality of sealing walls substantially reduce air leakage above said lower opening throughout an operating range of cut angle positions.

* * * * *